C. FLATTER & W. L. CASE.
SELF OILING BALL BEARING TROLLEY WHEEL.
APPLICATION FILED JAN. 31, 1916.

1,212,338. Patented Jan. 16, 1917.

INVENTORS
CARL FLATTER AND WM. L. CASE
BY
A. S. McLundie.
ATTORNEY.

UNITED STATES PATENT OFFICE.

CARL FLATTER AND WILLIAM L. CASE, OF ALTON PARK, TENNESSEE, ASSIGNORS OF ONE-NINTH TO CHARLES H. STEPHENSON, OF ALTON PARK, TENNESSEE.

SELF-OILING BALL-BEARING TROLLEY-WHEEL.

1,212,338.	Specification of Letters Patent.	Patented Jan. 16, 1917.

Application filed January 31, 1916. Serial No. 75,336.

*To all whom it may concern:*

Be it known that we, CARL FLATTER and WILLIAM L. CASE, citizens of the United States, residing at Alton Park, in the county of Hamilton and State of Tennessee, have invented certain new and useful Improvements in Self-Oiling Ball-Bearing Trolley-Wheels, of which the following is a specification.

This invention relates to a trolley wheel and more particularly to that type of trolley wheel which is provided with a self-oiling axle.

The present invention has for one object the provision of a wheel of the above mentioned character which is comparatively simple in construction since it comprises a minimum number of parts and therefore is inexpensive to manufacture.

A further object resides in the novel construction and arrangement of parts whereby oil is automatically fed to the bearing.

Figure 2:
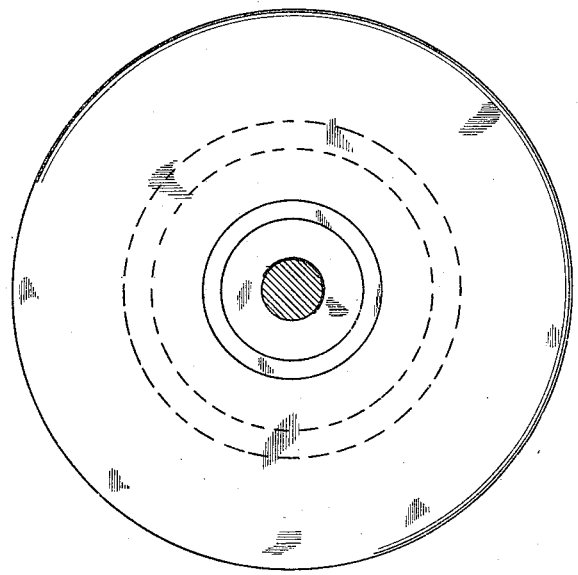
Figure 1:
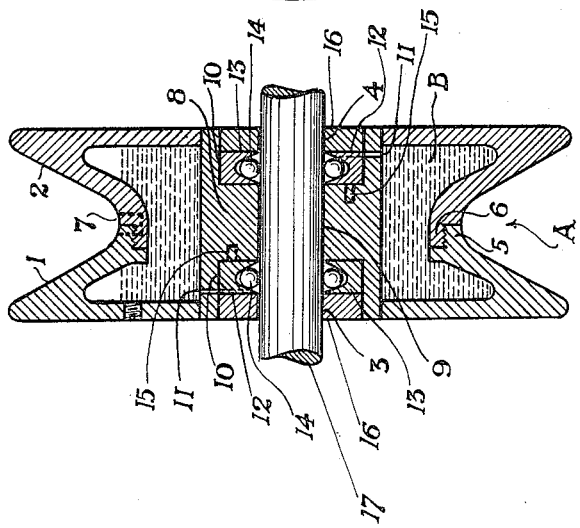

With the above and other objects in view, we will now describe a specific embodiment of the invention which is illustrated in the accompanying drawing, wherein:

Figure 1 is a central section through a trolley wheel; and Fig. 2 is a side elevation of the same.

In detail: The trolley wheel comprises the two halves 1 and 2 each of which is hollowed out as shown and centrally apertured at 3 and 4, respectively. The said halves are each flanged, as shown at 5 and 6, the former being provided with female threads while the latter is male threaded and thus the halves are screwed together as shown and when so joined form a peripheral trolley wire groove —A—. A pin 7 is driven through the two flanges 5 and 6 and finished flush with the face of the groove —A— thus providing means which prevents relative movement of halves 1 and 2 with respect to each other.

The central apertures 3 and 4 of the two halves have driven therethrough a hub 8 which forms a tight joint with the edges of the apertures 3 and 4, thus providing a lubricant reservoir —B—. The hub 8 has a central bore 9 which is bounded at either end with counter-bores 10—10. Passages 11 lead to counter-bores 10—10 and aline with face grooves 12 in bearing races 13 which accommodate balls 14, thus forming anti-friction bearings which are set into said counter-bores. Pins 15 prevent said races 13 from turning and collars 16 are driven in on top of races 13 and prevent displacement of the latter. An axle 17 is journaled in the bearings thus formed and, as will be seen, automatically receives lubricant from the reservoir formed within the wheel.

While we have herein described a specific embodiment of our invention, it is nevertheless to be understood that in practice we may resort to such modifications as fall within the scope of the invention as defined in the appended claims.

We claim:

1. A trolley wheel comprising a hollow body forming a lubricant reservoir and having a peripheral trolley wire groove, a hub in said body provided on each face with a counter-bore, anti-friction bearings in said counter-bores, said hub having oil passages leading from said reservoir to said bearings, and an axle journaled in said hub and bearings.

2. A trolley wheel comprising a hollow body centrally apertured and forming a lubricant reservoir, said body having a peripheral trolley wire groove, a hub counter-bored on each face and driven into the central aperture of said hub, anti-friction bearings in said counter-bores, said hub having oil passages leading from said reservoir to said bearings, and an axle journaled in said bearings.

3. A trolley wheel comprising a hollow body centrally apertured and forming a lubricant reservoir, said body having a peripheral trolley wire groove, a hub counter-bored on opposite sides and driven into said central aperture, ball races in said counter-bores, balls in said races forming anti-friction bearings, collars driven into said counter-bores to hold said ball races in position, said hub having oil passages leading from said reservoir to said bearings, and an axle journaled in said bearings.

4. A trolley wheel comprising two substantially hollow centrally apertured halves threaded together to form an oil reservoir having a peripheral trolley wire groove, a pin holding said halves against movement relative to each other, a centrally apertured hub driven through the apertures in said reservoir and having passages connecting therewith, said hub having end counter-bores, ball races in said counter-bores each having a groove registering with one of said oil passages, means to prevent movement of said ball races relative to said hub, balls in said races forming anti-friction bearings, a collar driven in each counter-bore to hold said ball races in position, and an axle journaled in said collars, bearings and hub and lubricated from said oil reservoir.

In testimony whereof we have hereunto set our hands in the presence of two subscribing witnesses.

CARL FLATTER.
WILLIAM L. CASE.

Witnesses:
MARGUERITE HEFLING NEWCOMB,
BENJAMIN R. NEWCOMB.

Copies of this patent may be obtained for five cents each, by addressing the "Commissioner of Patents, Washington, D. C."